United States Patent Office 2,720,514
Patented Oct. 11, 1955

---

2,720,514

ROSIN CONDENSATES AND THEIR PREPARATION

Alfred L. Rummelsburg, Chadds Ford, Pa., assignor to Hercules Powder Company, Wilmington, Del., a corporation of Delaware No Drawing. Application December 29, 1951,
Serial No. 264,242

19 Claims. (Cl. 260—97)

This invention relates to a process for treating rosin and rosin compounds to produce a resinous condensation product of improved properties.

It is known that rosin is deficient for many purposes because of its softness and poor bodying characteristics. Polymerization of rosin has been one means practiced by the art to overcome such deficiencies and by this means some improvement has been obtained in bodying, drying, and flexibility characteristics. Another method for improving rosin has involved treatment with an aldehyde in the presence of strong acid catalysts to form an aldehyde condensation product. The softening point of rosin was thereby increased to some extent but the process was unsatisfactory due to the tendency of aldehydes to polymerize in the presence of the catalysts heretofore utilized in the reaction, and also the improvement of the rosin was not entirely satisfactory. There has been a need in the art for a new and more efficient process for improving the properties of rosin.

Now in accordance with this invention, it has been found that rosin and rosin derivatives may be reacted with an aldehyde or aldehyde polymer in the presence of an acidic siliceous clay catalyst to produce a condensation product exhibiting improved properties. The process is particularly advantageous in that the clay catalyst may be easily separated from the reaction mixture by simple filtration at the completion of the reaction. Thus, the rosin condensation product may be obtained more easily using the process of this invention than is possible with prior art processes using liquid catalysts. In addition, there is little tendency for aldehydes to polymerize during the reaction of the present process due to the peculiar nature of the acidic siliceous clay catalyst utilized, and thus, one of the greatest disadvantages of the prior art processes is overcome.

An additional advantage of the present invention over those of the art is manifested by the high softening point products produced when particular aldehydes or aldehyde polymers are used as modifying agents. For example, trioxane may be reacted with rosin in the presence of an acidic siliceous clay catalyst such as acid-treated montmorillonite in accordance with this invention to produce a product having a higher softening point than products produced by prior art processes.

The general procedure for preparing the rosin condensates of this invention in a batch process involves contacting a solution of rosin in an inert solvent with, for example, an aldehyde polymer such as trioxane in the presence of an acidic siliceous clay catalyst such as an acid-activated montmorillonite and heating the reaction for a sufficient period of time to promote the desired degree of condensation. The reaction mixture may then be filtered to remove the catalyst and distilled to remove unreacted reagents, by-products, if present, and solvent, leaving the condensate as residue.

The following examples represent specific embodiments of the invention. Unless otherwise specified, all parts are parts by weight and color grades refer to the rosin color scale.

Example 1

A solution of 200 parts N wood rosin in 250 parts benzene was placed in an electrically heated stainless steel rocking-type autoclave, and 27 parts trioxane and 25 parts of commercial 200-mesh acid-treated montmorillonite clay catalyst were added. The catalyst had been calcined by heating at 400° C. for 3 hours. Nitrogen was used to sweep out the air and to pressure the reaction vessel to 100 p. s. i. g. at 25° C. The mixture was agitated for 2 hours at 120°–125° C. with the pressure reaching a maximum of 175 p. s. i. g. during this period. The reaction mixture was then cooled to room temperature, removed from the autoclave, and filtered to separate the catalyst. The catalyst was washed with benzene and the wash added to the previous filtrate. Unreacted trioxane and solvent were removed by distillation at reduced pressure. The yield of rosin-trioxane condensate amounted to about 201 parts and had an acid number of 155, a drop softening point of 128° C., and a color H.

Example 2

A solution of 200 parts N wood rosin and 250 parts benzene was placed in an electrically heated stainless steel rocking-type autoclave, and 27 parts paraformaldehyde and 25 parts of commercial 200-mesh acid-treated montmorillonite clay catalyst were added. The catalyst had been calcined by heating at 400° C. for 3 hours. Nitrogen was used to sweep out the air and to pressure the reaction vessel to 100 p. s. i. g. at 25° C. The mixture was agitated for 2 hours at 120°–125° C. with the pressure reaching a maximum of 175 p. s. i. g. during this period. The reaction mixture was then cooled to room temperature, removed from the autoclave and filtered to separate the catalyst. The catalyst was washed with benzene and the wash added to the previous filtrate. Unreacted paraformaldehyde and solvent were removed by distillation at reduced pressure. The yield of rosin-paraformaldehyde condensate amounted to 207 parts and had an acid number of 150, a drop softening point of 118° C., and a color I+.

Example 3

The process of Example 1 was carried out except that trioxane was replaced with 80 parts aqueous 30% formaldehyde solution. After removal of catalyst by filtration the filtrate was washed with water to remove any unreacted formaldehyde present and solvent was evaporated. The rosin-formaldehyde condensate had an acid number of 149, a drop softening point of 100° C. and a color F+.

Example 4

The procedure of Example 1 was carried out except that trioxane was replaced with 40 parts acetaldehyde. There was produced a condensate in the amount of 205 parts having an acid number of 156, a drop softening point of 101° C., and a color F+.

Example 5

A solution of 600 parts N wood rosin in 600 parts paramenthane was heated to 120° C. with agitation and 75 parts calcined commercial acid-treated montmorillonite clay was added followed by 121 parts β-ethoxypropionaldehyde. The reaction mixture was agitated for about ½ hour at 115°–120° C. and continued for an additional 1.5 hours at 120°–122° C. During this period water which formed was removed by means of an attached trap. The reaction mixture was filtered and the condensate recovered as in Example 1. The yield of condensate amounted to 659 parts and had an acid number of 150, a drop softening point of 100° C. and a color G.

The catalysts of this invention may be described as acidic siliceous clays and are exemplified by clays of the hydrous aluminum silicate type such as bentonites, sub-bentonites, montmorillonites, and the like, or their commercial acid-activated counterparts, which are available under various trade names.

The quantity of acidic siliceous catalyst can also be varied widely. It has been found that up to 200% or more based on the rosin or rosin compound, may be utilized. The reaction rate is proportional to the quantity of catalyst employed and increases with increased quantities of catalyst. In many cases where the quantity of catalyst is varied from 30 to 200% by weight of the rosin, simultaneous color refining also occurs with the result that the condensate produced is substantially lighter in color than the original rosin. Noncalcined acidic siliceous catalysts are operable in the process, but precalcination improves the reactivity of the catalyst. Calcination involves heating the catalyst at temperatures above 150° C. for a few hours.

Any solvent which is inert under the conditions of the reaction can be utilized. Exemplary of such solvents are aromatic and aliphatic hydrocarbons such as benzene, toluene, xylene, etc., hexane, heptane, octanes, and narrow range aliphatic hydrocarbon fractions boiling from 90°–110° C. or higher. The particular solvent in any given case will be dictated by the nature of the reagents utilized. In general, it may be said that paraffin hydrocarbons are preferred solvents for the reaction as being least reactive with respect to the preferred reagents.

Polar solvents such as alcohols, ketones, and ethers may also be used as solvents but are less preferable. When alcohols are utilized, reaction conditions must be sufficiently mild to prevent esterification with carboxyl groups of the rosin if esterification is not desired. The condensation can be carried out in the absence of a solvent if the reaction temperature is sufficiently high to insure the molten state, but this procedure is less preferable.

The rosins which may be modified according to this invention may be those obtained by extraction from the stumps from the Jeffrey and Ponderosa pines as well as the rosins well-known to the art, such as, for example, the rosins obtained from the southern long-leaf pine tree. The rosins may be either the crude or refined types and may be of either the wood or gum variety. The refined types of rosin which may be treated in accordance with this invention are those which have been distilled under reduced pressure with the injection of an inert gas, extracted with color body solvents, and treated with various adsorbents for the removal of various impurities, as color bodies visible and latent, oxidized resin acids, etc. The rosin may be subjected to a preliminary heat treatment or, if desired, the heat treatment step may follow the treatment in accordance with the reaction of this invention, as may the other refining treatments given hereinabove. Desirably, the heat treatment will follow the condensation reaction and will be carried out in an inert atmosphere as, for example, carbon dioxide, nitrogen, etc.

In addition to wood and gum rosin, the rosin compounds which may be treated in accordance with this invention include partially hydrogenated or dehydrogenated rosins and also the acids attainable from these rosins, such as, for example, abietic acid, neoabietic acid, levopimaric acid, dextropimaric acid, isodextropimaric acids, etc.; esters of these rosin acids with a monohydric or polyhydric alcohol such as methyl abietate, ethyl abietate, glycerol abietate, pentaerythritol abietate, etc.; the alcohols produced by the reduction of the carboxyl group of a rosin acid such as abietyl alcohol, pimaryl alcohol, etc., and also the esters of these alcohols.

Rosin acids containing materials such as tall oil and rosins separated from tall oil, such as sulfate wood rosin, may be modified according to this invention. It is desirable to remove from such material prior to modification in accordance with this invention any contaminants which might react with the reagents used. When tall oil is treated in accordance with the process of this invention, the rosin constituents of tall oil form a condensate with the modifying agent employed, whereas the fatty acid constituents do not. The fatty acid constituents may be separated from the condensate by vacuum distillation and, therefore, the process of this invention provides a convenient method for separating the constituents of tall oil, while at the same time improving the properties of the rosin acids.

The modifying agents of this invention comprise aldehydes and aldehyde polymers generally. Among the aldehydes which are useful in this invention, aliphatic aldehydes such as formaldehyde, acetaldehyde, propionaldehyde, butyraldehyde, etc., may be mentioned. Aldehyde polymers which may be used as modifying agents include paraformaldehyde, paraldehyde, trioxane, and the like.

Saturated acyclic aldehydes having not more than three carbon atoms in the aldehyde chain such a propionaldehyde and β-ethoxypropionaldehyde, and aldehyde polymers formed from aldehydes having not more than three carbon atoms in the aldehyde chain are preferred in this invention as leading to higher softening point condensates. Unsaturated acyclic aldehydes containing not more than four carbon atoms in the aldehyde chain, such as acrolein and cotonaldehyde, may be utilized but are less desirable due to their tendency to polymerize during the reaction. Trioxane is particularly preferred as a modifying agent for the reason that there may be produced, using trioxane in the process of this invention, a product having a higher softening point than is possible using prior art processes. Thus, when using trioxane as a modifying agent, this invention enjoys the advantages of the siliceous clay catalyst, while at the same time producing an improved product not available to the art heretofore.

The quantity of trioxane or other modifying agent required in carrying out the process of this invention will depend upon the molecular weight of the modifying agent, reaction temperature, quantity of catalyst, and rosin or rosin compound concentration. The quantity of modifying agent is not critical, but will usually vary from 1 to 70% of the weight of the rosin or rosin compound, and preferably within the range of 2 to 25%.

When the process of this invention is carried out in a batch-type reaction, the temperature is preferably maintained within the range of about 60°–160° C. with the most desirable range being about 80°–135° C. In a continuous process wherein shorter up- and down-heat periods are possible and better control in achieving very short reaction periods is obtainable, temperatures as high as 225° C. can be utilized. In a closed system under pressure temperatures of 180°–300° C. are permissible and 210°–275° C. are preferable.

When low boiling reagents are utilized in carrying out the process of this invention, it is desirable to use a closed system. Operating pressures range from 25 to 200 p. s. i. g. depending upon other reaction conditions and quantities of reagents utilized. However, when it is desirable to avoid a closed system it is possible to operate at atmospheric pressure under reflux by choosing a relatively high boiling solvent for the reaction. Under these conditions, water formed may be simultaneously distilled off if the boiling point of the aldehyde or its polymer is sufficiently high to permit it to remain. The reaction time can be varied widely and is a function of temperature, quantity of catalyst, amount of excess modifying reagent, and concentration of rosin or rosin compound. The reaction time can be varied from about 1 minute to several hours and will usually lie within the range of 5 minutes to 2 hours. The quantity of the various reagents used in carrying out the process of this invention is not critical, but in order to achieve the greatest advantages from the process, it is desirable that the concentration of rosin or rosin compound based on the solvent be within the range of about 10 to about 80% by weight, and preferably within the range of about 35 to 65%. In general, the reaction time decreases as the concentration of rosin or rosin compound is increased.

By means of the process of this invention, there may be produced rosin condensates having higher drop softening points and paler colors. Using N wood rosin and trioxane, there may be obtained a rosin condensate having a drop softening point as high as 128° C. if the reaction is carried out until about 60% or more of the constituents in the rosin is reacted. Varying degrees of softening points within the range of 80°–130° C. can be obtained by controlling the reaction conditions and the quantities of reagent.

The condensates of this invention are useful in many applications where unmodified rosin compounds have been found wanting. Also, the condensates of this invention may be readily hydrogenated or dehydrogenated using well-known catalysts to produce additional interesting products. Hydrogenated and dehydrogenated rosin condensates may be used in rubber compounding, adhesives and in various other fields where ordinary rosin is unsuitable.

The rosin condensates of this invention may be further modified by reaction with compounds such as metal oxides or metal hydroxides to form resinates useful as stabilizers and driers in film-forming materials. In addition, rosin condensates of this invention may be esterified with alcohols such as glycerol, pentaerythritol, etc. to produce light-colored products having drop softening points and viscosities comparable to those of the condensate starting material. These products are useful in protective coatings and related applications.

What I claim and desire to protect by Letters Patent is:

1. The process of producing a resinous condensation product which comprises subjecting a material containing a compound selected from the group consisting of rosin acids, esters of rosin acids, alcohols produced by the reduction of the carboxyl group of a rosin acid and esters of said alcohols to treatment with a compound of the group consisting of aldehydes and aldehyde polymers in the presence of an acidic siliceous clay catalyst at a temperature at about 60° to 300° C.

2. The process of producing a resinous condensation product which comprises subjecting rosin to treatment with a compound of the group consisting of aldehydes and aldehyde polymers in the presence of an acidic siliceous clay catalyst at a temperature of about 60° to 300° C.

3. The process of producing a resinous condensation product which comprises subjecting rosin to treatment with an aldehyde in the presence of an acid-activated siliceous clay catalyst at a temperature of about 60° to 300° C.

4. The process of producing a resinous condensation product which comprises subjecting rosin to treatment with an aldehyde polymer in the presence of an acid-activated siliceous clay catalyst at a temperature of about 60° to 300° C.

5. The process of producing a resinous condensation product which comprises subjecting rosin to treatment with formaldehyde in the presence of an acid-activated siliceous clay catalyst at a temperature of about 60° to 160° C.

6. The process of producing a resinous condensation product which comprises subjecting rosin to treatment with acetaldehyde in the presence of an acid-activated siliceous clay catalyst at a temperature of about 60° to 160° C.

7. The process of producing a resinous condensation product which comprises subjecting rosin to treatment with paraldehyde in the presence of an acid-activated siliceous clay catalyst at a temperature of about 60° to 160° C.

8. The process of producing a resinous condensation product which comprises subjecting rosin to treatment with paraformaldehyde in the presence of an acid-activated siliceous clay catalyst at a temperature of about 60° to 160° C.

9. The process of producing a resinous condensation product which comprises subjecting rosin to treatment with trioxane in the presence of an acid-activated siliceous clay catalyst at a temperature of about 60° to 160° C.

10. The process of producing a resinous condensation product which comprises subjecting rosin to treatment with paraldehyde in the presence of acid-treated bentonite at a temperature of about 60° to 160° C.

11. The process of producing a resinous condensation product which comprises subjecting rosin to treatment with paraformaldehyde in the presence of acid-treated bentonite at a temperature of about 60° to 160° C.

12. The process of producing a resinous condensation product which comprises subjecting rosin to treatment with trioxane in the presence of acid-treated bentonite at a temperature of about 60° to 160° C.

13. The process of producing a resinous condensation product which comprises subjecting rosin to treatment with paraldehyde in the presence of acid-treated montmorillonite at a temperature of about 60° to 160° C.

14. The process of producing a resinous condensation product which comprises subjecting rosin to treatment with paraformaldehyde in the presence of acid-treated montmorillonite at a temperature of about 60° to 160° C.

15. The process of producing a resinous condensation product which comprises subjecting rosin to treatment with trioxane in the presence of acid-treated montmorillonite at a temperature of about 60° to 160° C.

16. The process of producing a resinous condensation product which comprises subjecting rosin to treatment with trioxane in the presence of acid-treated bentonite at a temperature of about 80°–135° C.

17. The process of producing a resinous condensation product which comprises subjecting rosin to treatment with trioxane in the presence of acid-treated montmorillonite at a temperature of about 80°–135° C.

18. The process of producing a resinous condensation product which comprises subjecting tall oil to treatment with trioxane in the presence of acid-treated montmorillonite and by distillation, separating fatty acid constituents from the condensation product produced at a temperature of about 60° to 160° C.

19. The product produced by the process of claim 1.

References Cited in the file of this patent

UNITED STATES PATENTS

| | | |
|---|---|---|
| 2,022,456 | Binapfl | Nov. 26, 1935 |
| 2,052,073 | Binapfl | Aug. 25, 1936 |
| 2,084,213 | Osterof | June 15, 1937 |
| 2,115,496 | Maters | Apr. 26, 1938 |
| 2,372,446 | Osterof | Mar. 27, 1945 |
| 2,419,211 | Harris | Apr. 22, 1947 |
| 2,572,071 | St. Clair et al. | Oct. 23, 1951 |